United States Patent [19]

Shimokoshi

[11] Patent Number: 5,550,808
[45] Date of Patent: Aug. 27, 1996

[54] WINDOW-BASED ATM CELL STREAM REGULATOR

[75] Inventor: Kiyoshi Shimokoshi, Tokyo, Japan

[73] Assignee: Oki Electric Industry Co., Ltd., Tokyo, Japan

[21] Appl. No.: 413,852

[22] Filed: Mar. 29, 1995

[30] Foreign Application Priority Data

Apr. 1, 1994 [JP] Japan .................................. 6-064821

[51] Int. Cl.⁶ .................................................. H04J 3/22
[52] U.S. Cl. ........................... 370/17; 340/825.5; 370/60; 370/61; 370/94.1
[58] Field of Search ................................ 370/13, 14, 15, 370/16, 17, 54, 60, 60.1, 85.6, 61, 85.7, 85.8, 94.1, 94.2, 95.1, 95.2; 340/825.5, 855.51; 348/411, 409

[56] References Cited

U.S. PATENT DOCUMENTS 5,315,586  5/1994  Charvillat ...................... 370/60
5,416,521  5/1995  Chujoh et al. .................. 348/411
5,426,635  6/1995  Mitra et al. ..................... 370/60
5,442,624  8/1995  Bomomi et al. ................ 370/17

FOREIGN PATENT DOCUMENTS 6-291778  10/1994  Japan .

*Primary Examiner*—Alpus H. Hsu
*Assistant Examiner*—Ricky Q. Ngo
*Attorney, Agent, or Firm*—Law Office of Steven M. Rabin, P.C.

[57] ABSTRACT

A window-based ATM cell stream regulator composed of a means for detecting to which connection an arriving cell belongs among a plurality of connections, a detector for detecting when the cell arrived within the same connection based on its arrival time, a window start time stored in a memory and a predetermined window section length stored therein and a memory for storing the updated number of counted cells and the window start time.

8 Claims, 7 Drawing Sheets

FIG. 2

| S | Y |
|---|---|
| 0 | B |
| 1 | A |

FIG. 3

| OP | Y |
|---|---|
| 0 | A + B |
| 1 | A − B |

FIG. 4

| CONDITIONS | Y | Z |
|---|---|---|
| A > B | 1 | 0 |
| A = B | 0 | 1 |
| OTHERWISE | 0 | 0 |

FIG. 5
| CONDITIONS | Z1 | Z2 |
|---|---|---|
| $0 \leq A < T$ | 0 | 0 |
| $T \leq A < K \times T$ | 0 | 1 |
| $K \times T \leq A$ | 1 | 0 |
FIG. 6
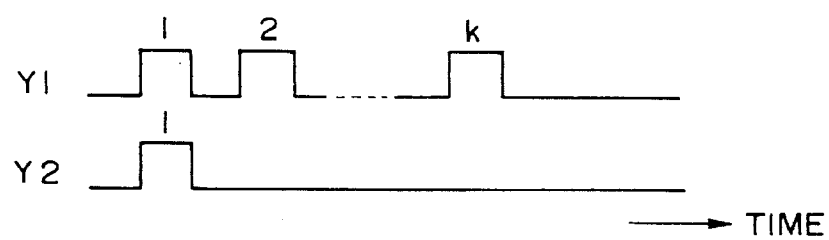
FIG. 7
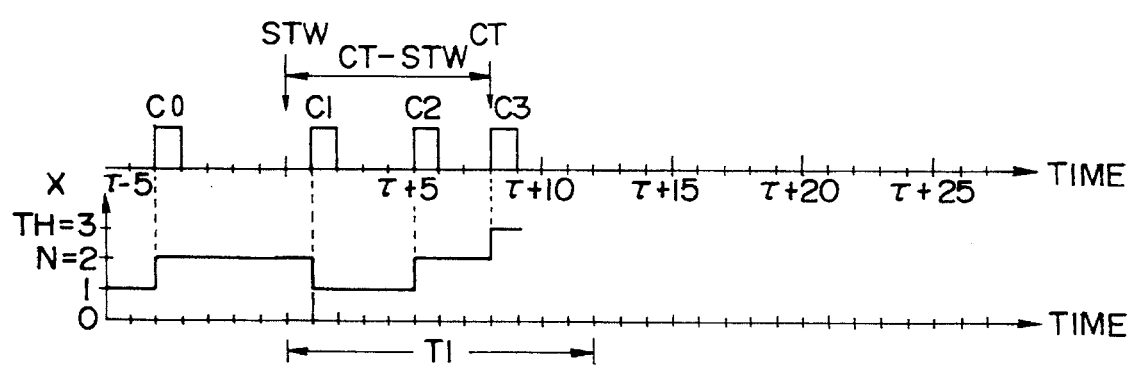

FIG. 13

| CONDITIONS | OUTPUT Q |
|---|---|
| $A < B1$ | 0 |
| $B1 \leq A < B2$ | 1 |
| $B2 \leq A < B3$ | 2 |
| ⋮ | ⋮ |
| $BK-1 \leq A < BK$ | $K-1$ |
| $BK \leq A$ | K | ial
WINDOW-BASED ATM CELL STREAM REGULATOR

BACKGROUND OF THE INVENTION

The present invention relates to a window-based ATM cell stream regulator for monitoring whether a cell is sent in accordance with a notified value of a communication bandwidth in a communication network of an Asynchronous Transfer Mode (ATM).

A function of monitoring a cell bandwidth in an ATM communication network is to previously determine an allowable cell bandwidth to be used by each terminal before communication starts, and to monitor at an inlet portion of the ATM communication network whether each terminal sends a cell or not in accordance with a corresponding allowable number during communication. The function of monitoring the cell communication bandwidth is generally called a Usage Parameter Control (UPC).

Several prior art UPC systems have been proposed. As one such system, there is a credit jumping window (CJW) system. In the CJW system, monitoring sections having time intervals, which are prescribed by the allowable number of the cell bandwidth, are successively set on a time base. The monitoring sections having such time intervals are called windows. In the CJW system, it is judged whether arriving cells satisfy the notified value of the communication bandwidth or not by counting the number of arriving cells in each window.

SUMMARY OF THE INVENTION

It is therefore an object of the invention to provide a window-based ATM cell stream regulator in which a notified value violation judgment can be commonly used for all connections to be monitored in an ATM communication network in which the number of connections to be monitored per one line can become enormous.

It is another object of the invention to provide a window-based ATM cell stream regulator which can be commonly used in every connection to be monitored even if arrival times of cells therein are different from one another.

It is still another object of the invention to provide a window-based ATM cell stream regulator capable of detecting to which connection an arriving cell belongs among a plurality of connections and detecting to which window of the same connection the arriving cell belongs based on an arrival time of the arriving cell, a window start time and a window section length.

It is still another object of the invention to provide a window-based ATM cell stream regulator which is small in circuit scale since the notified value violation judgment can be commonly used for all connections to be monitored.

Accordingly, a window-based ATM cell stream regulator according to the present invention comprises an arrival time detecting means for detecting an arrival time of an arriving cell, an arriving cell detecting means for detecting to which connection the arriving cell belongs among a plurality of connections, a memory means for storing therein a predetermined upper limit number, a predetermined allowable number, a predetermined window section length indicating a predetermined one window length, a predetermined reset time, the counted number of arriving cells and a window start time that is an initial value, a window detecting means for detecting to which window of the same connection the arriving cell belongs based on the arrival time, the window start time and the window section length, a counting means for counting the number of cells which have arrived in each connection and for counting the number of cells, which have arrived until the number of the counted cells in the same window exceeds the allowable number and reaches the upper limit number, as an allowable number of cells, an allowable number updating means for updating the counted number stored in the memory means to the allowable number of cells which have been counted by the counting means as a counting number in a succeeding window on a time base, a discarding means for discarding cells which arrive after the counted number of cells reaches the upper limit number which is greater than the predetermined allowable number, a counted number updating means for firstly updating the counted number if the arrival time is more than the predetermined window section length later than the window start time and within the reset time, a window updating means for firstly updating the window start time if the arrival time is more than the window section length later after the window start time and within the reset time, a reset means for secondly updating the counted number if the arrival time is more than the reset time later after the window start time and a reset updating means for secondly updating the window start time if the arrival time is more than the reset time later after the window start time.

BRIEF DESCRIPTION OF THE DRAWING

FIG. 2 is a view showing a truth table of a selector;

FIG. 3 is a view showing a truth table of an arithmetic operator;

FIG. 4 is a view showing a truth table of a comparator;

FIG. 5 is a view showing a truth table of a timing generator;

FIG. 6 is a timing chart showing latch signals;

FIG. 7 is a timing chart showing operation of the first and second embodiments of the invention;

FIG. 13 shows the output from monitor 1530 in accordance with various input conditions.

DETAILED DESCRIPTION OF THE PREFERRED EMBODIMENTS

FIRST EMBODIMENT (FIGS. 1 to 11)

Figure 1:
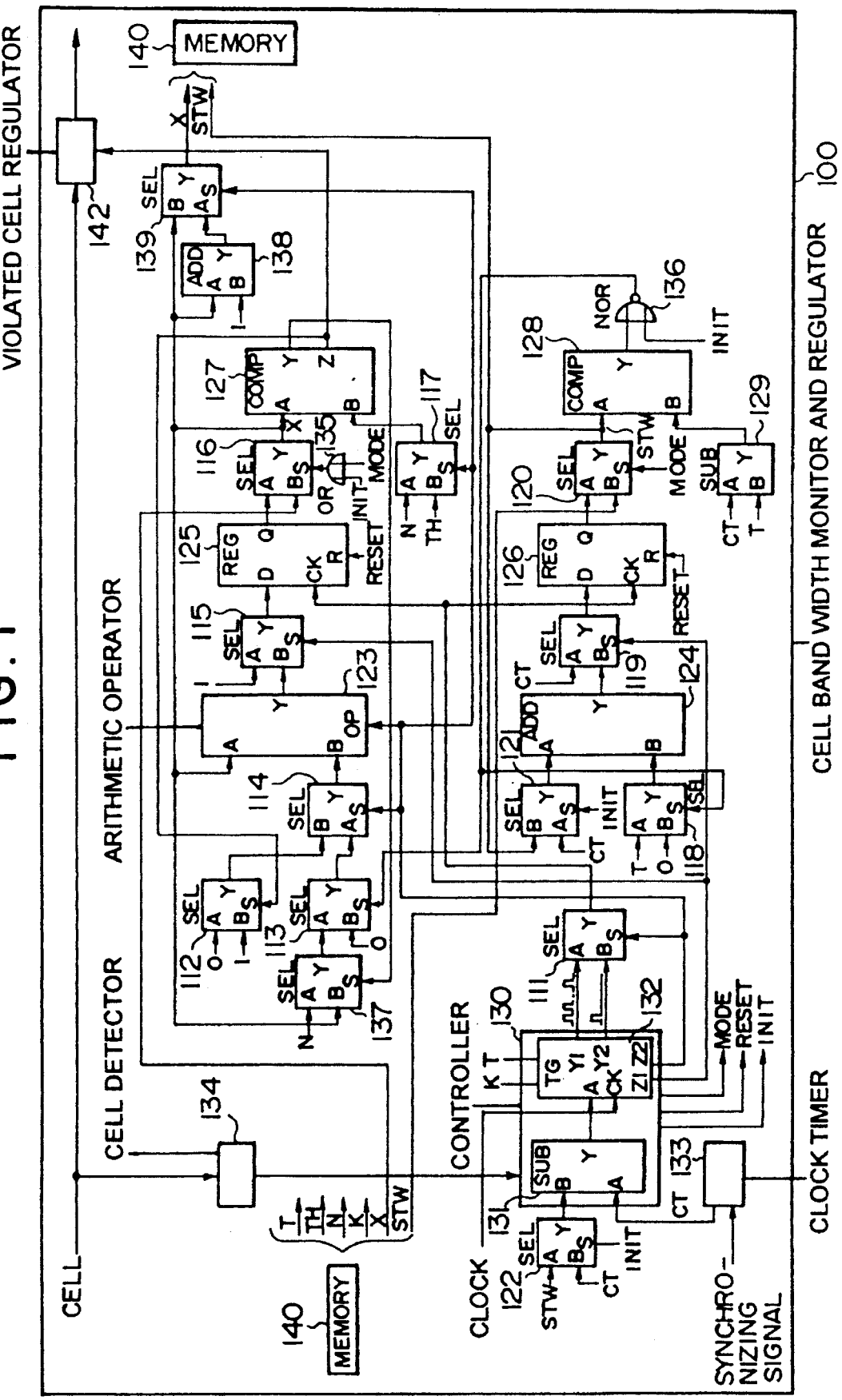
FIG. 1 is a block diagram showing an arrangement of a window-based ATM cell stream regulator according to a first embodiment of the invention.

FIG. 1 is a block diagram showing an arrangement of a window-based ATM cell stream regulator according to a first embodiment of the invention.

A window-based ATM cell stream regulator 100 (also referred to hereinafter as cell bandwidth monitor & regulator 100) comprises selectors (SELs) 111–122, 137 and 139, an arithmetic operator (AO) 123, adders (ADDs) 124 and 138, registers (REGs) 125 and 126, comparators (COMPs) 127 and 128, subtracters (SUBs) 129 and 131, a controller (CON) 130, a clock timer (CTI) 133, a cell detector (CD) 134, a violated cell regulator (VCR) 142, an OR gate (OR) 135 and a NOR gate (NOR) 136.

The selectors 112 and 114, the arithmetic operator 123 and the register 125 count the number X of arriving cells (referred to as a cell number X hereinafter) in a window section. The comparator 127 monitors whether the cell number X exceeds a given upper limit number TH or a given allowable number N based on an allowable cell bandwidth which is determined before communication starts. Selection of the upper limit number TH or the allowable number N is controlled by the selector 117. The selectors 118 and 119, the adder 124, the register 126, the comparator 128 and the subtracter 129 update a window start time STW in case an arriving interval of the cells (referred to as a cell arriving interval hereafter) exceeds a window section. The selectors 113 and 137 update the cell number X in case the cell arriving interval exceeds the window section. The selector 116 outputs the cell number X in response to a mode switching signal MODE from the controller 130. The selector 120 outputs a window start time STW in response to the mode switching signal MODE from the controller 130. The selectors 121 and 122 initialize the window start time STW when a leading cell in the same connection arrives. The connection means the relationship between terminals wherein data can be transmitted between the terminals. That is, it is the communication routes of the cell.

In the cell bandwidth in the ATM communication, plural connections are present since data is sent and received between a plurality of terminals. The selector 139 outputs the cell number X or X+1 as an updated cell number X to the memory 140 in response to a control signal which is prescribed by the cell arriving interval. The clock timer 133 distributes current time at the cell arrival time to the selectors 119, 121 and 122 and the subtracter 129 and 131 in the cell bandwidth monitor & regulator 100. The cell detector 134 detects whether a cell which arrived from the virtual channel identifier (VCI) given for every cell is an object of bandwidth monitoring or not. Further, if the VCI given to every cell teaches that it is an object of bandwidth monitoring, the cell detector 134 detects to which connection among plural connections the arriving cell belongs. The cell detector 134 notifies the control circuit 130 of the result of detection.

The control circuit 130 outputs various control signals MODE, INIT, and RESET based on the notification signal from the cell detector 134, current time information CT from the clock timer 133, a reset time K, described later, of a predetermined bandwidth monitor parameter, and a window section T, etc. The control circuit 130 concurrently outputs latch signals Y1 and Y2 to the register 125 and 126. The control circuit 130 further outputs a selection signal Z1 to be applied to the selectors 115 and 119, and a selection signal Z2 to be applied to the selectors 111, 114, 117 and 139, and the arithmetic operator 123.

The control circuit 130 is mainly composed of the subtracter 131 and a timing generator (TG) 132. The subtracter 131 counts the difference between the current time information CT and the window start time STW or the difference between the current time information CT and the current time information CT. The timing generator 132 detects when, in the same connection, the cell which is input to the cell detector 134 arrived. The timing generator 132 produces the latch signals Y1 and Y2 based on the operation result of the subtracter 131 and the input clock CK. The timing generator 132 also produces the selection signals Z1 and Z2 based on the operation result of the subtracter 131, the reset time K and the window section T which are stored in the memory 140, and the input clock signal CK.

The violated cell regulator 135 discards the arriving cell when the number of arriving cells exceeds the upper limit number TH, as a result of a judgment by the comparator 127. The violated cell regulator 135 permits the arriving cell to pass when the number of arriving cells does not exceed the upper limit number TH as a result of a judgment by the comparator 127. The OR gate 135 executes an OR operation between the initialize signal INIT and the mode switching signal MODE. The OR gate 135 controls the selector 116 based on the result of this operation. The NOR gate 136 executes a NOR operation between an output Y of the comparator 128 and the initialize signal INIT. The NOR gate 136 controls the selectors 118 and 113.

The selectors 111 to 122, 137 and 139 output an input B in case the control terminal signal S is 0 while they output an input A in case the control terminal signal S is 1, as shown in FIG. 2.

The arithmetic operator 123 outputs A+B which is the sum of the input signals A and B in case the control signal OP is 0 while it outputs A−B which is the difference between the input signal A and B in case the control signal OP is 1, as shown in FIG. 3.

The comparators 127 and 128 set an output depending on the input condition, as shown in FIG. 4. That is, the comparators 127 and 128 output Y=1 and Z=0 in case the input condition is A>B. The comparators 127 and 128 output Y=0 and Z=1 in case the input condition is A=B. The comparators 127 and 128 output Y=Z=0 in case of a condition other than the aforementioned conditions.

The timing generator 132 outputs Z1=Z2=0 in case the input condition A is less than the window section T, as shown in FIG. 5. The timing generator 132 outputs Z1=0 and Z2=1 in case the input condition A is greater than the window section T but less than K×T, as shown in FIG. 5. Further, the timing generator 132 outputs Z1=1 and Z2=0 in case the input condition A is greater than K×T as shown in FIG. 5. The latch signals Y1 and Y2 which are output from the timing generator 132 are a signal composed of a train of K pulses and a signal composed of a single pulse respectively, as shown in FIG. 6.

The reset time K is a constant (K=1, 2, 3, . . . ) for setting the reset time of a predetermined window start time STW. Suppose that the reset time K=4 in the first embodiment.

The subtracter 129 calculates A−B which is the difference between the input signals A and B. The subtracter 129 outputs the result of calculation to the comparator 128. The subtracter 131 also calculates A−B which is the difference between the input signals A and B. The subtracter 131 outputs the calculation result to the timing generator 132. The selecting operation of the selectors 111, 114, 117, and 139 and the computing operation of the arithmetic operator 123 are controlled in response to the selection signal Z2 from the timing generator 132. The selection signal Z2 is set to 1 only in case the value to be input to the timing generator 132 is greater than the window section T but less than K×T. The selection signal Z2 is set to 0 in case the value to be input to the timing generator 132 is other than the aforementioned values. The selector 111 outputs the latch signal Y1 or Y2 output from the timing generator 132 in response to the selection signal Z2. That is, the selector 111 outputs the latch signal Y1 in case the expression of Z2=1 is established. The selector 111 outputs the latch signal Y2 in case the expression Z2=0 is established. Further, the selector 111 controls the registers 125 and 126 by the output Y thereof. The selector 117 inputs the upper limit number TH or allowable number N to the comparator 127. Further, the selector 116 inputs the cell number X to the comparator 127. The comparator 127 compares the cell number X with the upper limit number TH or allowable number N so as to judge whether the former reaches the latter or not when the cell arrives.

The selecting operation of the selector 112 is controlled by the judging output Z from the comparator 127. That is, the selection operation of the selector 112 is controlled depending on whether the cell number X reaches the upper limit number TH or the allowable number N or not.

The selection operation of the selector 113 is controlled by the result of a NOR operation between the output Y of the comparator 128 and the initialize signal INIT. That is, the selection operation of the selector 113 is controlled depending on whether the current window start time STW is greater than the difference between the current time information CT and the window section T or not.

The selection operations of the selectors 115 and 119 are controlled in response to the selection signal Z1 output from the timing generator 132. The selection signal Z1 output from the timing generator 132 is set to 1 only when the value of the input A exceeds K×T. At this time, the selector 115 outputs 1 as an initial value of the cell number X. The selector 119 outputs the current time information CT as an initial value of the window start time STW.

The selection operation of the selector 116 is controlled by the result of an OR operation between the mode switching signal MODE and the initialize signal INIT which are output from the control circuit 130. The selection operation of the selector 120 is controlled by the mode switching signal MODE which is output from the controller 130.

The mode switching signal MODE is temporarily set to 0 by the control of the timing generator 132 when a monitor object cell arrives in each monitor object connection. The mode switching signal MODE is set to 1 immediately thereafter. The initialize signal INIT is set to 1 by the control of the timing generator 132 only when the first cell arrives in the monitor object connection. The initialize signal INIT is always set to 0 in a case other than the aforementioned cases. The reset signal RESET is set to 0 by the control of the timing generator 132 only when the first cell arrives in the monitor object connection.

The selecting operation of the selector 118 is controlled by the result of NOR operation between the output Y of the comparator 128 and the initialize signal INIT. That is, the selecting operation of the selector 118 is controlled depending on whether an update value of the window start time STW is greater than the difference between the current time information CT and the window section T. The selection operations of the selectors 121 and 122 are controlled by the initialize signal INIT output from the controller 130. The result of selection of the selectors 121 and 122 gives an initialize value of the window start time STW. The register 125 is reset to an output value 0 by the reset signal RESET which is output from the controller 130 when the monitor object cell arrives. The register 125 thereafter latches an output value of the selector 115 in accordance with the latch signal Y1 or Y2 which is selected by the selector 111. The register 126 is reset to an output value 0 by the reset signal RESET which is output from the controller 130 when the monitor object cell arrives. Thereafter, the register 126 latches an output value of the selector 119 in accordance with the latch signal Y1 or latch signal Y2 selected by the selector 111.

Described hereinafter are operations of the cell bandwidth monitor & regulator 100 having the aforementioned arrangement. The operations are explained with reference to four cases, namely, firstly, a case where the cell which arrived at the cell detector 134 is a leading cell, secondly is a case where the expression of 0<CT−STW<T is satisfied, thirdly is a case where the expression of T≦CT−STW<K×T is satisfied, and fourthly is a case where the expression of K×T≦CT−STW is satisfied.

The clock timer 133 is always incremented one-by-one in conformity with a synchronous signal regardless of arrival of the monitor object cell. The clock timer 133 further supplies the current time information CT to elements in the cell bandwidth monitor & regulator 100. The memory 140 stores the window section T, upper limit number TH, allowable number N and the reset time K as the previously determined bandwidth monitoring parameters. The memory 140 also stores the cell number X and the window start time STW as the bandwidth monitoring variables which are updated in the cell bandwidth monitor & regulator 100. Every time when a cell in the monitor object connection arrives in the cell detector 134, i.e., the bandwidth monitoring parameters stored in the memory 140, the window section T, the upper limit number TH, allowable number N and the reset time K are read out in the device. At the same time, the cell number X and the window start time STW stored in the memory 140 as the bandwidth monitoring variables are also read out in the device.

Described first is the case where the cell which arrived at the cell detector 134 is a leading cell. When the cell detector 134 detects the cell in a monitor object connection, it notifies the controller 130. When the arriving cell is detected as a leading cell by the timing generator 132 inside the controller 130, the controller 130 outputs the reset signal RESET to the registers 125 and 126. The register 125 is reset to 0 in response to the reset signal RESET output from the controller 130. At this time, the initialize signal INIT output from the controller 130 is set to 1. Accordingly, the selector 116 can output a value from the register 125. As a result, the cell number X is once initialized to 0.

The time information CT of the cell which arrived from the clock timer 133 is input into the subtracter 131. The time information CT from the selector 122 is also input into the subtracter 131 since the initialize signal INIT is 1. The subtracter 131 executes a subtraction process on of these input values. The timing generator 132 inputs thereinto CT−CT from the subtracter 131. The timing generator 132 outputs the selection signal Z1=Z2=0 under the condition of 0<A<T since the expression of CT−CT=0 is established. As a result, the selector 117 outputs the upper limit number TH. The comparator 127 compares an initialized cell number X which is input from the selector 116 with the upper limit number TH which is input from the selector 117. The comparator 127 outputs Z=0 since the cell number X is less than the upper limit number TH. As a result, the selector 112 outputs 1. The NOR gate 136 outputs 0 since the initialize signal INIT is 1. As a result, the selector 118 outputs 0.

The selector 111 outputs the latch signal Y2 of one pulse alone since the selection signal Z2 of the timing generator 132 is 0. The selector 114 outputs a value from the selector 112 since the selection signal Z2 of the timing generator 132 is 0. The arithmetic operator 123 inputs thereinto a cell number X which has been initialized from the selector 116.

The arithmetic operator 123 also inputs thereinto 1, from the selector 114.

Referring to an update processing of the cell number X, the arithmetic operator 123 executes a compute processing of the cell number X+1 since the selection signal Z2 of the timing generator 132 is 0. As a result of computation, the arithmetic operator 123 outputs 1 since the expression of X=0 is established. This value is latched in the register 125. The initialized cell number X is updated to the cell number X=1. The selector 139 outputs the updated cell number X (X=1) from the selector 116 since the selection signal Z2 of the timing generator 132 is 0. The updated cell number X is stored in the memory 140. The adder 124 inputs thereinto the current time information CT from the selector 121 since the initialize signal INIT is 1. Further, the adder 124 inputs thereinto 0 from the selector 118 since the initialize signal INIT is 1. Referring to the update processing of the window start time STW, the adder 124 adds the time information CT which is input from the selector 121 to 0 which is input from the selector 118. As a result of the addition, the adder 124 outputs the time information CT. Accordingly, the window start time STW is latched by the register 126. Consequently, the window start time STW is updated to the time information CT. The selector 120 outputs the value of the updated window start time STW since the mode switching signal MODE is 1. The updated window start time STW is thus stored in the memory 140.

Described above is the processing operation in the case where the leading cell in the monitor object connection arrives in the cell bandwidth monitor & regulator 100. When the cells arrive thereafter, the initialize signal INIT from the controller 130 is always set to 0. Accordingly, the selectors 121 and 122 always output the input A. That is, the selector 121 outputs the time information CT which has arrived from the clock timer 133. The selector 122 outputs the window start time STW from the memory 140. The selector 116 is directly controlled in response to the mode switching signal MODE without being affected by the initialize signal INIT. The NOR gate 136 always outputs inversely the output Y of the comparator 128 regardless of the initialize signal INIT.

Described next is the case where the cell that arrives in the cell detector 134 meets the expression of $0<CT-STW<T$. This is the time when the cell in the monitor object connection arrives within the window section T after the window start time STW in the same connection.

If the timing generator 132 in the controller 130 detects that the arriving cell meets the expression of $0<CT-STW<T$, the timing generator 132 outputs Z1=Z2=0 in the same way as in the case where the leading cell arrives as described above. As a result, the selector 111 outputs one pulse signal Y2 as a latch signal. The selector 117 outputs the upper limit number TH. The selector 114 outputs a signal which is input from the selector 112. As mentioned above, the mode switching signal MODE is once set to 0 after the arrival of the cell. Accordingly, the selector 116 outputs the cell number X which is input from the memory 140. The selector 120 outputs the window start time STW which is input from the memory 140.

The comparator 128 inputs thereinto the window start time STW from the selector 120. The comparator 128 inputs thereinto CT−T from the subtracter 129. The comparator 128 outputs Y=1 under the condition of $CT-T<STW$. As a result, the NOR gate 136 outputs 0. The selector 118 outputs 0 since the output of the NOR gate 136 is 0. Accordingly, the adder 124 adds 0 which is input from the selector 118 to the window start time STW which is input from the selector 121.

As a result of the addition, the adder 124 outputs the window start time STW.

The register 126 inputs thereinto the window start time STW from the selector 119. The register 126 is not varied in its latch output before and after the arrival of cells. Accordingly, the register 126 outputs the value of window start time STW as it is.

The comparator 127 inputs thereinto the current value of the cell number X from the selector 116. The comparator 127 also inputs thereinto the upper limit number TH from the selector 117. The comparator 127 compares the current cell number X with the upper limit number TH. As a result of the comparison, the comparator 127 outputs Z=0 to the selector 112 on the condition $X<TH$. On the other hand, as a result of comparison, the comparator 127 outputs Z=1 to the selector 112 under the condition X=TH. The selector 112 outputs 1 when the output Z from the comparator 127 is 0. That is, the selector 112 outputs 1 if the current value of the cell number X does not reach the upper limit number TH up to now. As a result, the arithmetic operator 123 executes an addition processing to add +1 to the cell number X since the expression of OP=0 is established. That is, the arriving cell is judged as a normal cell, and hence the updated value of the cell number X is latched in the register 125. On the other hand, if the output Z from the comparator 127 is 1, the selector 112 outputs 0. That is, when the cell number X reaches the upper limit number TH, the selector 112 outputs 0. As a result, the arithmetic operator 123 does not increment the cell number X. Namely, the arriving cell is judged as a violated cell. As a result, the violated cell regulator 142 sends out the arriving cell at the time of Z=0 as a notified value violation judging process in accordance with the output Z of the comparator 127. The violated cell regulator 142 refrains from sending out the arriving cell or takes other proper measures at the time of Z=1 as the notified value violation judging process.

The selector 139 outputs the cell number X which is input from the selector 116 as it is since the selection signal Z2 which is output from the timing generator 132 is 0. The cell number X as a bandwidth monitoring variable and the value of the window start time STW after the execution of the notified value violation judging process are stored again in the memory 140.

Figure 8:
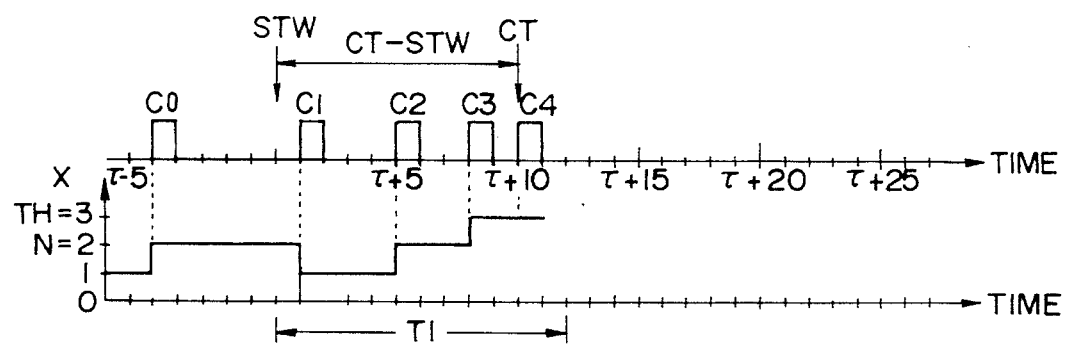
FIG. 8 is a timing chart showing operation of the first and second embodiments of the invention.

The aforementioned operations are now described with reference to timing charts of FIGS. 7 and 8. In FIGS. 7 and 8, Ci (i=0, 1, 2, 3, 4) represents an arriving cell in the same connection. T1 represents a monitor window section. It is supposed that the window section T is 12, upper limit number TH is 3 and the allowable number N is 2.

In FIG. 7, suppose that a third cell C3 arrives at the current time CT=τ+8 within the window section T1 which started at time τ. At this time, the time difference of CT−STW is less than the window section T. Further, the cell number X of the cell 3 is less than the upper limit number TH. Accordingly, the cell 3 is judged as a normal cell. Therefore, the cell number X is incremented by 1 while the window start time STW is held.

In FIG. 8, suppose that a fourth cell C4 arrives at the current time CT=τ+10 within the window T1 which started at time τ. At this time, the time difference CT−STW is less than the window section T in the same way as in FIG. 7. This cell 4 is less than the window T1 but the cell number X thereof already has reached the upper limit number TH. Accordingly, the cell 4 is judged as a violated cell. Therefore, the cell number X is not subjected to count processing while the window start time STW is held.

Described now is the case where the cell that arrives at the cell detector 134 meets the expression of $T \leq CT-STW < K \times T$. This is the case where the cell in the monitor object connection arrives at the time when the difference between the current time CT and the window start time STW is greater than window section T but less than $K \times T$.

The timing generator 132 outputs Z1=0 and Z2=1 as control signals if the arriving cell is detected to meet the expression of $T \leq CT-STW < K \times T$ by the timing generator 132 in the controller 130. As a result, the selector 111 outputs a signal Y1 composed of a train of K pulses as a latch signal. The selector 117 outputs the allowable number N to the comparator 127. Since at least one monitor window is terminated, the arriving cell is always considered to be a normal cell. The selector 115 selects the output from the arithmetic operator 123. The selector 119 selects the output from the adder 124.

Since the mode switching signal MODE is once set to 0 after the arrival of the cell as mentioned above, the selector 116 outputs the cell number X which is input from the memory 140. Since the mode switching signal MODE is once set to 0 after the arrival of the cell, the selector 120 outputs the window start time STW.

The comparator 128 inputs the window start time STW from the selector 120. The comparator 128 also inputs CT–T from the subtracter 129. The comparator 128 outputs Y=0 under the condition of CT–T≧STW. As a result, the NOR gate 136 outputs 1. The selector 118 outputs T since the output of the NOR gate 136 is 1. Accordingly, the adder 124 adds T input from the selector 118 to the current window start time STW which is input from the selector 121. As a result of the addition, the adder 124 outputs a value which is obtained by adding +T to the window start time STW. From this, the current window section T, which is input from the selector 118, is added to the window start time STW by the adder 124. A first pulse of the latch signal Y1 in the current window start time STW is latched in the register 126. The thus updated window start time STW is again compared by the comparator 128 with CT–T, which is input from the subtracter 129.

As a result of the comparison, the comparator 128 outputs 0 if the expression of CT–T>STW is established. From this, the NOR gate 136 outputs 1. As a result, the selector 118 outputs 1. The adder 124 adds the window section T which is input from the selector 118 to the window start time STW which is input from the selector 121. Namely, +T is further added to the window start time STW by the adder 124. This update processing of the window start time STW is likewise successively repeated. However, since the latch signal Y1 has K pulses, the update processing is executed K times in all. In the course of update processing, the comparator 128 outputs 1 if the expression of CT–T≧STW is not established. At this time, the NOR gate 136 outputs 0. As a result, the selector 118 outputs 0. The adder 124 adds 0 which is input from the selector 118 to the window start time STW which is input from the selector 121. Namely, 0 is added to the window start time STW by the adder 124. The update processing of the window start time STW is likewise successively repeated. However, the addition of STW+0, is repeated in the update processing of the window start time STW since the output of the selector 118 is 0. Namely, when the output of the selector 118 becomes 0, the value of the window start time STW is held in the register 126.

When the update processing of the window start time STW is repeated, the value of the window start time STW is updated to a correct window start time STW that is the nearest to the arrival time of the cell. The updated window start time STW is stored in the memory 140. During the update processing, the cell number X is also updated similarly. Since the selection signal Z2 of the timing generator 132 is 1, the selector 117 outputs the allowable number N. The comparator 127 judges whether the current cell number X exceeds the allowable number N or not. If the cell number X exceeds the allowable number N, the comparator 127 outputs 1 from the output Y. As a result, the selector 137 outputs N. During the update processing of the window start time STW, the selector 113 outputs the value which is input from the selector 137 while the condition of CT–T≧STW is established. The arithmetic operator 123 inputs thereinto the allowable number N from the selector 114. The arithmetic operator 123 also inputs thereinto the cell number X which is output from the selector 116. The arithmetic operator 123 executes subtraction processing of X–N, since the control signal Z2 from the timing generator 132 is 1.

On the other hand, the comparator 127 outputs 0 from the output Y if the cell number X does not exceed the allowable number N. As a result, the selector 137 outputs the current cell number X. The arithmetic operator 123 inputs thereinto the cell number X from the selector 114. The selector 137 inputs thereinto the cell number X which is output from the selector 116. Whereupon, the arithmetic operator 123 executes subtraction processing of X–X, since the control signal Z2 from the timing generator 132 is 1. Accordingly, from the result of subtraction, the arithmetic operator 123 outputs 0. The 0 output from the arithmetic operator 123 is latched in the register 125. The register 125 repeats the computation processing of the cell number X which arrives in the window section, K times in response to the latch signal Y1. Successively, as to computation of the cell number X of arriving cells in the window section T, X=0 is maintained since 0 is always output from the output Y of the comparator 127. Namely, the value of cell number X of arriving cells in the window section T is held in the register 125 after the output from the selector 137 becomes the current cell number X. That is, the update processing of the window start time STW stops when the output of the NOR gate 136 becomes 0. That is, the update processing of the window start time STW stops when the expression of CT–T<STW is established as a result of comparison by the comparator 128.

As a result, the selector 113 outputs 0 even in case the expression of X>0 is established. Accordingly, the arithmetic operator 123 repeats the subtraction processing of X–0, until the latch processing by the K pulses is terminated in response to the latch signal Y1. From this, the value of the cell number X which arrives in the window section T is held in the register 125 even if the output of the NOR gate 136 becomes 0. When the latch processing by the K pulses is terminated, 1 is added by the adder 138 to the current updated cell number X since the selection signal Z2 of the timing generator 132 is 1. The value of the cell number X to which 1 is added by the adder 138 is stored in the memory 140.

Figure 9:
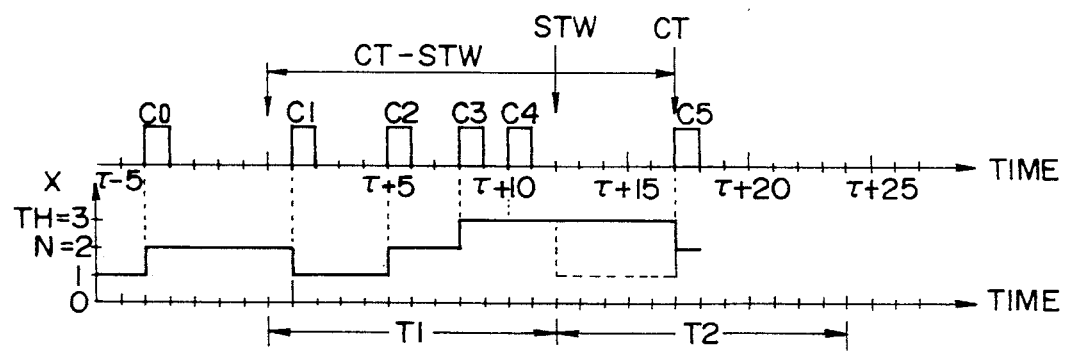
FIG. 9 is a timing chart showing operation of the first and second embodiments of the invention.
Figure 10:
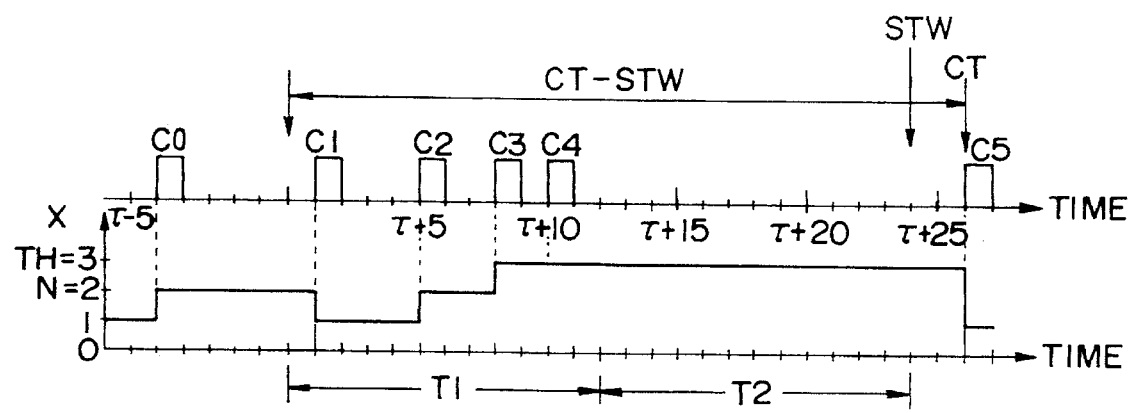
FIG. 10 is a timing chart showing operation of the first and second embodiments of the invention.

The aforementioned operations will be described with reference to the timing charts of FIGS. 9 and 10. In FIGS. 9 and 10, Ci (i=0, 1, . . . , 5) represents an arriving cell in the same connection. T1 and T2 represent window sections respectively. It is supposed that the window section T is 12, upper limit number TH is 3 and the allowable number N is 2.

In FIG. 9, a succeeding cell C5 arrives at the current time CT=τ+17 in the window T1 which started at time τ after the cell C4 arrived at CT=τ+10. It is evident that the window T1 is terminated at the time of the arrival of the cell C5 since the time difference of CT−T>STW is established. Accordingly, +T is added to the window start time STW. Then, the window start time STW=τ is updated to STW=τ+12. At this time, N is subtracted from the cell number X in the update processing of the cell number X since the expressions of the cell number X−3 and X>N are established. As a result, the cell number X is updated to X=1. At this time, the condition of the difference of CT−T>STW is not established in the update processing of the cell number X. Accordingly, both update processing of the window start time STW and that of the cell number X are terminated at this time. The cell number X is incremented by 1 for the arriving cell 5. As a result, cell number X=2 becomes the last output.

In FIG. 10, the cell 5 arrives more than two window sections later after the current window start time STW. A valve +T is added two times to the window start time STW. The window start time STW=τ is updated to STW=τ+24. Accordingly, a new window section T3 is set for the window section T. At this time, N is subtracted from the cell number X in the update processing of the cell number X since the expressions of X=3 and X>N are established. As a result, the cell number X is updated to X=1. The number X is subtracted from the cell number X in the second update processing since the expressions of X=3 and X> N are established. As a result, the cell number X is updated to X=0.

The cell number X is incremented by 1 for the arriving cell 5 and the cell number X=1 becomes the last output.

Described next is the case where the cell that arrives in the cell detector 134 meets the expression of K×T≦CT−STW. This is a case wherein the cell in the monitor object connection arrives at a time more than the window section T×K later than the current window start time STW.

The timing generator 132 outputs Z1=1 and Z2=0 as control signals if it detects that the arriving cell meets the expression of K×T≦CT−STW. As a result, the selector 111 outputs a signal Y2 composed of only one pulse as a latch signal. The selector 117 outputs the upper limit number TH to the comparator 127. The arriving cell is always considered to be a normal cell since at least one monitor window is terminated. The selector 115 outputs 1 since the control signal Z1 from the timing generator 132 is 1. This value of 1 is latched in the register 125. Likewise, the selector 119 outputs T. This value of T is latched in the register 126. As mentioned above, the mode switching signal MODE output from the controller 130 is inverted to 1 immediately after it is temporarily set to 0 at the time of arrival of the cell. As a result, the cell number X is finally updated to X=1. The window start time STW is updated to STW=CT. The updated window start time STW is stored in the memory 140. A value of the updated cell number X is the control signal Z2=0 of the timing generator 132. Accordingly, the updated cell number X output from the selector 116 is stored in the memory 140 as it is.

Figure 11:
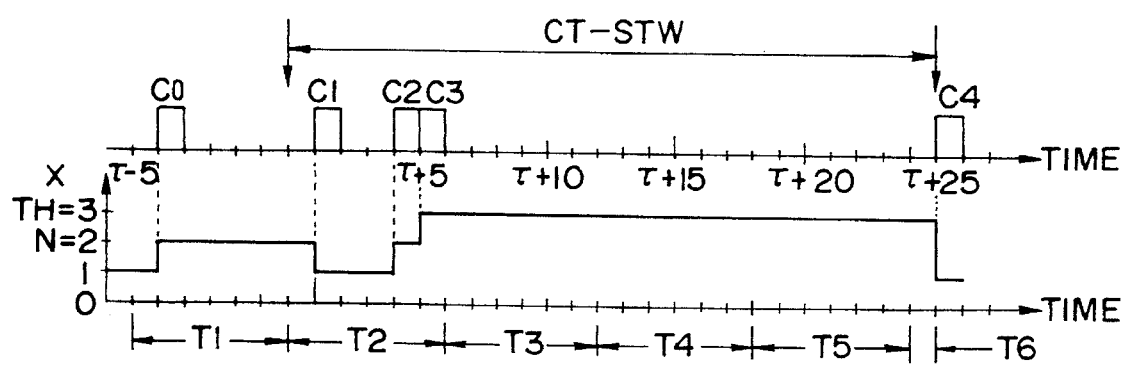
FIG. 11 is a timing chart showing operation of the first and second embodiments of the invention.

The aforementioned operations will be described with reference to the timing chart of FIG. 11. In FIG. 11, Ci (i=1, 2, 3, 4) represents an arriving cell in the same connection. Tj (j=1, 2, . . . , 6) represents a window section. It is supposed that the window section T is 6, upper limit number TH is 3 and the allowable number N is 2.

In FIG. 11, the cell C3 arrives at the current time CT=τ+5 in the window T2 which started at time τ, thereafter, a succeeding cell C4 arrives therein at the current time CT=τ+ 25. In the first embodiment, the reset time K is supposed to be 4. Therefore, the arrival of the cell 4 occurs after a lapse of time more than K×T. The cell number X is incremented by 1 for the arriving cell C4. As a result, the cell number X=1 finally becomes the last output. Further, a new window start time STW is updated to the current time CT. That is, such window start time STW is not updated to the correct value STW=τ+24 but is reset to the current time information CT at which the cell arrives. That is, in such a case, an approximate value of the window start time STW is given to the window start time STW.

As mentioned above, according to the first embodiment, the notified value violation judgment can be commonly used among entire monitor object connections, even in a ATM communication network in which there is a possibility that the number of monitor object connections per one line becomes enormous. Further, even if the arrival times of the cells in the entire monitor object connections are different from one another, namely, even if the arrival times are different from one another in every connection, a cell flow monitoring device can be commonly used.

SECOND EMBODIMENT (FIGS. 7 to 12)

Figure 12:
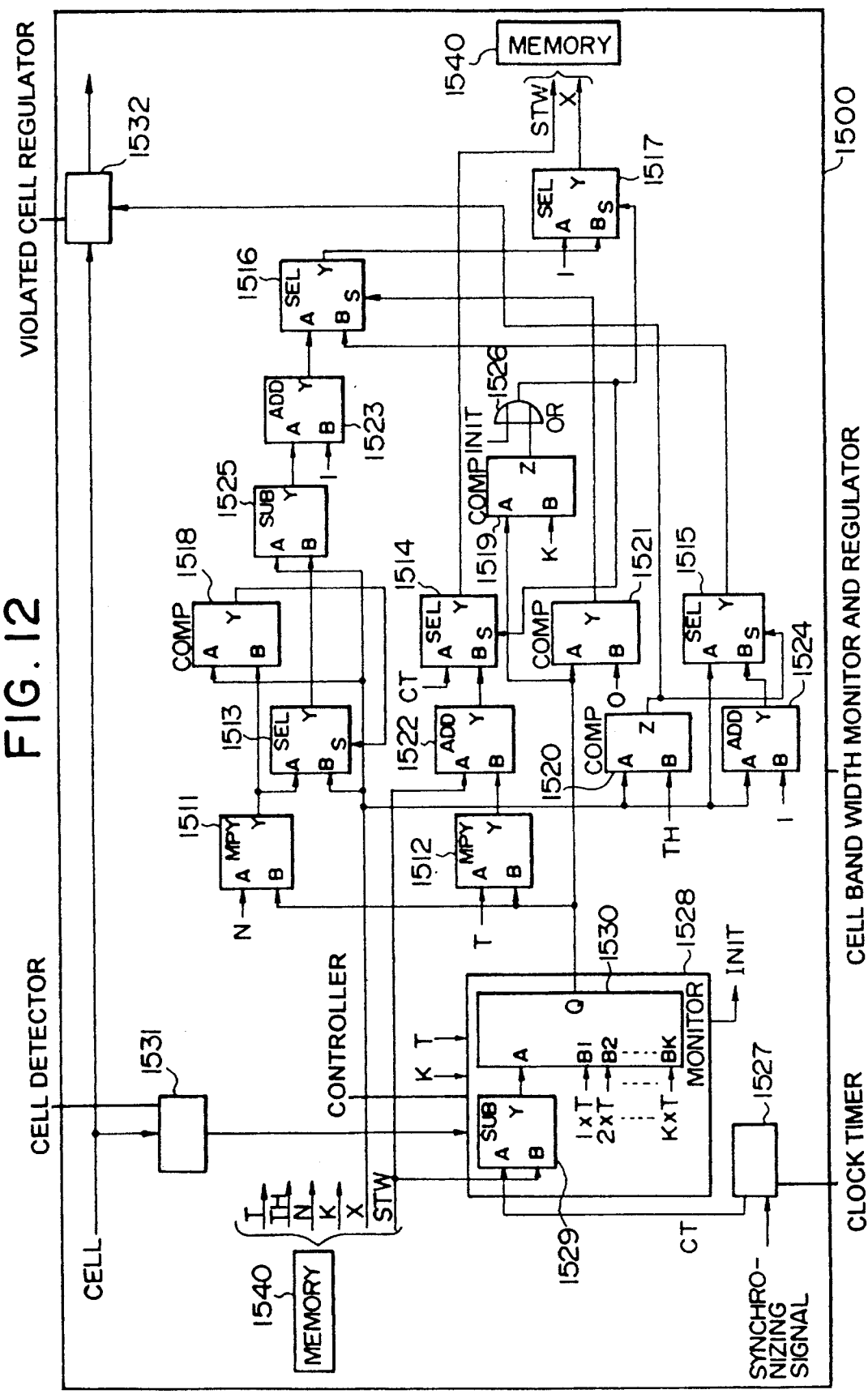
FIG. 12 is a block diagram showing an arrangement of a window-based ATM cell stream regulator according to the second embodiment of the invention.

FIG. 12 is a block diagram showing an arrangement of a cell bandwidth monitor & regulator 1500 according to a second embodiment of the invention. In FIG. 12, elements having the same structure and function as those of FIG. 1 are denoted at the same numerals and an explanation thereof is omitted.

The cell bandwidth monitor & regulator 1500 comprises multipliers (MPYs) 1511 and 1512, selectors (SELs) 1513 to 1517, comparators (COMPs) 1518 to 1521, adders (ADDs) 1522 to 1524, a subtracter (SUB) 1525, an OR gate 1526, a clock timer (CTI) 1527, a controller (CON) 1528, a cell detector (CD) 1531 and a violated cell regulator (VCR) 1532.

The multiplier 1511, the selector 1513, the comparator 1518 and the adder 1523 execute an update processing for the cell number X in a case where the window is terminated before the arrival of the cell. On the other hand, the adder 1524, the comparator 1520 and the selector 1515 execute an update processing in a case where the window is not terminated before the arrival of the cell. Whether the window is terminated or not is controlled by the selector 1516 based on the result of a judgment by the comparator 1521.

The comparator 1521 compares with 0 the number of window terminations which is input from the controller 1528. The comparator 1521 and adder 1522 execute an update processing of the window start time STW based on the number of window terminations which is input from the controller 1528.

The selector 1517 executes a reset processing of the cell number X when the leading cell arrives in the monitor object connection and when it detects that the number of window terminations exceeds K before the arrival of the cell. The selector 1514 executes a reset processing of the window start time STW when the leading cell arrives in the monitor object connection and when it detects that the number of window terminations exceeds, K before the arrival of the cell. The OR gate 1526 executes an OR operation between the output Z of the comparator 1519 and the initialize signal INIT. The OR gate 1526 controls the selector 1517. The controller 1528 outputs the initialize signal INIT of the control signal and the number of window terminations before the arrival of the cell using a notification signal from the cell detector 1531, the current time information CT from the clock timer, a reset time K of the predetermined bandwidth monitoring parameter and the window section T of the predetermined bandwidth monitor parameter.

The controller 1528 is mainly composed of a subtracter 1529 and a monitor 1530. The subtracter 1529 calculates the difference between the current time CT and the current window start time STW. The monitor 1530 compares the inputs A and B. The input A is the result of operation of the subtracter 1529. The input B is each value of i×T (i=1, 2, . . . K) based on the reset time K and window section T. As a result, the monitor 1530 calculates the times of termination of the windows before the arrival of a certain cell when the certain cell arrived. From this, the monitor 1530 can detect the time when the cell which is input to the cell detector 1531 arrived in the same connection.

The selectors 1513 to 1517, like those of the first embodiment, 1517 operate in accordance with the truth table shown in FIG. 2. The comparators 1518 to 1521, like those of the first embodiment operate in accordance with the truth table as shown in FIG. 4. Further, the monitor 1530 in the controller 1528 outputs in accordance with input conditions as shown in FIG. 13. That is, the monitor 1530 outputs Q=0 under the input condition of A<B1. The monitor 1530 also outputs Q=1 under the input condition of B1<A<B. The monitor 1530 further outputs Q=2 under the input condition of B2≦A<B3. Likewise, the monitor 1530 outputs Q=K under the input condition of BK≦A.

The selecting operation of the selector 1513 is controlled based on the result of judgment by the comparator 1518. From this, the selector 1513 outputs X or Q×N as a value to be subtracted from the cell number X. The selection operation of the selector 1514 is controlled by the output from the OR gate 1526. That is, the selector 1514 resets the window start time STW to the current time CT when the leading cell arrives in the monitor object connection or when the window terminations is detected over K times before the arrival of the cell. The selecting operation of the selector 1517 is controlled by the output from the OR gate 1526. That is, the OR gate 1526 resets the cell number X to an initial value 1 when the leading cell arrives in the monitor object connection or when a window terminations is detected over K times before the cell arrives. The selection operation of the selector 1515 is controlled by the output of the comparator 1520. That is, the selecting operation of the selector 1515 is controlled depending on whether the arriving cell is a violated cell or not. The selection operation of the selector 1516 is controlled by the judgment output of the comparator 1521. That is, the selection operation of the selector 1515 is controlled depending on whether the termination of the window occurs or not before the cell arrives. The initialize signal INIT which is output from the controller 1528 is set to 1 under the control of the comparator 1530 only when the first cell arrives in each monitor object connection. The initialize signal INIT which is output from the controller 1528 is always set to 0 in a case other than the aforementioned cases.

Described hereinafter are operations of the cell bandwidth monitor & regulator 1500 having the aforementioned arrangement. The operations are explained with reference to four cases like the first embodiment, namely, firstly a case where the cell which arrives in the cell detector 134 is a leading cell, secondly a case where the expression of 0<CT−STW<T is satisfied, thirdly a case where the expression of T≦CT−STW<K×T is satisfied, and fourthly a case where the expression of K×T≦CT−STW is satisfied.

The clock timer 1527 is always incremented by one in conformity with a cell synchronous signal regardless of the arrival of the monitor object cell. The clock timer 1527 supplies the current time information CT to the cell bandwidth monitor & regulator 1500 regardless of the arrival of the monitor object cell. A memory 1540 stores the window section T, upper limit number TH, allowable number N and reset time K as the previously determined bandwidth monitor parameters. The memory 1540 also stores the cell number X and the window start time STW as the bandwidth monitor variables which have been updated in the cell bandwidth monitor & regulator 1500. Every time that cell in the monitor object connection arrives in the cell detector 134, the window section T, upper limit number TH, allowable number N and reset time K which are stored in the memory 140 as the bandwidth monitor parameters are read out in the device. At the same time, the cell number X and the window start time STW as the bandwidth monitor variables stored in the memory 1540 are also read out in the cell bandwidth monitor & regulator 1500. It is supposed that the reset time K is 4 also in the second embodiment.

Described first is the case where the cell that arrives at the cell detector 134 is a leading cell. When the cell detector 134 detects the cell in the monitor object connection, it notifies the controller 1528. When the arrived cell is detected as a leading cell by the monitor 1530 inside the controller 1528, the controller 1528 outputs the initialize signal INIT=1. As a result, the OR gate 1526 outputs 1. The selector 1517 outputs 1 since the output of the OR gate 1526 is 1. That is, the cell number X is updated to 1. Likewise, the selector 1514 outputs the current time CT when the cell arrives since the output of the OR gate 1526 is 1. Namely, the cell number X and window start time STW are updated. The updated cell number X and window start time STW are stored in the memory 1540.

Described next is the case where the cell that arrives in the cell detector 134 meets the expression of 0<CT−STW<T. This is the time when the cell in the monitor object connection arrives within the window section T after the window start time STW in the same connection.

If the controller 1530 detects that the arriving cell meets the expression 0<CT−STW<T, it outputs a window termination frequency number Q=0. As a result, the comparator 1521 output 0 since the expression 0=0 is established.

The selector 1516 outputs a value which is input from the selector 1515 since the output of the comparator 1521 is 0. The value which is input to the selector 1515 is the cell number X which is read out from the memory 1540 as the updated value of the cell number X or that incremented by +1. The value output from the selector 1515 is determined by the comparator 1520 depending on whether the current cell number X which is read out from the memory 1540 reaches the upper limit number TH or not. The selector 1515 outputs the cell number X as it is if the current cell number X which is read out from the memory 1540 reaches the upper limit number TH. On the other hand, the selector 1515 outputs the updated value of X+1 if the current cell number X which is read out from the memory 1540 does not reach the upper limit number TH.

The comparator 1519 inputs thereinto the window termination number Q. The comparator 1519 compares the window termination number Q with the reset time K. The comparator 1519 outputs 0 since the window termination number Q is 0. From this, the OR gate 1526 outputs 0 since the initialize signal INIT is 0. The selector 1517 outputs the output of the selector 1516 as a new cell number X since the output of the OR gate 1526 is 0. Likewise, a value output from the selector 1514 is the result of an operation performed by the multiplier 1512 and adder 1522 for the update processing of the window start time STW. The multiplier 1512 outputs 0 since the window termination number Q output from the monitor 1530 is 0. From this, the value output from the selector 1514 is the value of the current window start time STW read out from the memory as it is. The updated cell number X and the window start time STW are stored in the memory.

The aforementioned operations are described with reference to the timing charts of FIGS. 7 and 8. Detailed descriptions of FIG. 7 and FIG. 8 are omitted since the operations are the same as those of the first embodiment.

Described next is the case where the cell arriving in the cell detector 134 meets the expression of T≦CT−STW<K×T. This is a case wherein the cell in the monitor object connection arrives at the current time CT that is more than the window section T later than but within K×T after the current window start time STW of the same connection. The monitor 1530 outputs the window termination number Q if it detects that the arriving cell meets the expression of T≦CT−STW<K. A value of the window termination number Q satisfies the expression of 0<Q<K. The arriving cell is always considered to be a normal cell since at least one monitor window is terminated. The multiplier 1512 multiplies the window termination number Q which is input from the monitor 1530 by the window section T. As a result of this multiplication, the multiplier 1512 outputs Q×T. The adder 1522 adds Q×T which is input from the multiplier 1512 to the current window start time STW which is input from the memory. The selector 1514 outputs a value input from the adder 1522 since the output of the OR gate 1526 is 0. From this, a value of the updated window start time STW is stored in the memory. Likewise, the multiplier 1511 multiplies the window termination number Q input from the monitor 1530 by the allowable number N. As a result of this multiplication, the multiplier 1511 outputs Q×N. The comparator 1518 compares Q×N input from the multiplier 1511 with the current cell number X input from the memory. As a result of this comparison, the comparator 1518 outputs Y=1 if the expression of X>Q×N is established. On the other hand, the comparator 1518 outputs Y=0 if the expression of X≦Q×N is established.

The selector 1513 outputs Q×N input from the multiplier 1511 if the output of the comparator 1518 meets the expression of X>Q×N. The selector 1513 outputs the current cell number X input from the memory if the output of the comparator 1518 meets the expression of X≦Q×N. The subtracter 1525 subtracts Q×N or X from the current cell number X. Thus, the update processing of the cell number X at the termination of the window section is completed. The adder 1523 increments the result of the subtracter 1525 by 1 for the arriving cell. The adder 1523 further sets a new cell number X. Further, the adder 1523 sets a new cell number X. The selector 1516 outputs the new cell number X since the output of the comparator 1521 is 0. The selector 1517 outputs a value input from the selector 1516 since the output of the OR gate 1526 is 0. From this, the updated value of the cell number X is stored in the memory.

The aforementioned operations are described with reference to the timing charts of FIGS. 9 and 10.

FIG. 9 shows an example of termination of the window section T one time (i.e. Q=1) before the cell arrives. FIG. 10 shows an example of termination of the window section T two times (i.e. Q=2) before the cell arrives. A detailed explanation of FIGS. 9 and 10 is the same as that of the first embodiment.

Described next is the case where the cell arriving in cell detector 134 meets the expression K×T≦CT−STW. This is a case wherein the cell in the monitor object connection arrives at the current time CT that is more than the window section T×K later than the current window start time STW. In this case too, as mentioned above, the arriving cell is always considered to be a normal cell since at least one monitor window is terminated. The monitor 1530 outputs the window termination number K if it detects that the arriving cell meets the expression of K×T≦CT−STW. The comparator 1519 inputs K thereinto from the monitor 1530. As a result, the comparator 1519 outputs 1. Accordingly, the OR gate 1526 outputs 1. The selector 1514 input 1 thereinto from the OR gate 1526. Accordingly, the selector 1514 outputs the current time CT when the cell arrives. As a result, the window start time STW is updated to the current time CT. The window start time STW is stored in the memory. The selector 1517 also outputs 1 since it inputs 1 thereinto from the OR gate 1526. As a result, the cell number X is updated to 1. Further, the cell number X is stored in the memory. That is, the reset processing for the window start time STW and cell number X are executed since the expression of K×T≦CT−STW is established.

The aforementioned operations are illustrated in the timing chart of FIG. 11. A detailed description of FIG. 11 is the same as that of the first embodiment.

What is claimed is:

1. A window-based ATM cell stream regulator comprising:

arrival time detecting means for detecting an arrival time of an arriving cell;

arriving cell detecting means for detecting to which connection, among a plurality of connections, the arriving cell belongs;

memory means for storing therein a predetermined allowable number, a predetermined upper limit number greater than the allowable number, a predetermined window section length indicating a predetermined single window length, a predetermined reset time, a counted number of arriving cells and a window start time that is an initial value and will be updated;

window detecting means for detecting to which window of a connection the arriving cell belongs based on the arrival time, the window start time and the window section length;

counting means for counting a number of cells which have arrived in each connectionu, and for counting a number of cells, that have arrived until a number of the counted cells in a single window exceeds the allowable number and reaches the upper limit number, and then designating the counted number of cells having reached the upper limit number as an allowable number of cells;

allowable number updating means for updating the counted number stored in said memory means to the allowable number of cells, which have been counted by said counting means, as a counting number in a succeeding window on a time base;

discarding means for discarding cells which arrive after the counted number of cells reaches the upper limit number;

counted number updating means for updating the counted number if the arrival time is later than the window start time by an amount no less than the predetermined window section length, and less than the reset time;

window updating means for updating the window start time if the arrival time is later than the window start time by an amount no less than the window section length and less than the reset time;

resetting means for updating the counted number if the arrival time is later than the window start time by an amount no less than the reset time; and reset updating means for updating the window start time if the arrival time is later than the window start time by an amount no less than the reset time.

2. A window-based ATM cell stream regulator according to claim 1, wherein the reset time is longer than the window section length.

3. A window-based ATM cell stream regulator according to claim 1, wherein the cell is an object of bandwidth monitoring.

4. A window-based ATM cell stream regulator according to claim 1, wherein the counted number updating means updates said counted number in accordance with a window termination frequency if the arrival time is within the reset time after the window start time, the window termination frequency being a number of windows in which cells did not arrive after the window start time.

5. A window-based ATM cell stream regulator according to claim 1, wherein said window update means updates said window start time to a start time of a window to which the arrival time belongs.

6. A window-based ATM cell stream regulator according to claim 1, wherein the reset means resets said counted number.

7. A window-based ATM cell stream regulator according to claim 1, wherein said reset update means updates the window start time to the cell arrival time.

8. A window-based ATM cell stream regulator according to claim 1, wherein the window detecting means detects to which window the cell belongs in a same connection by detecting at an arrival time of the cell how many times windows have been terminated before the arrival time based on the arrival time, said window start time and the window section length.

* * * * *